United States Patent [19]

Giuliani et al.

[11] 4,284,743
[45] Aug. 18, 1981

[54] PROCESS FOR THE CROSS-LINKING OF HIGH DENSITY POLYETHYLENE WITH DIENE UNITS IN SOLID STATE

[75] Inventors: Gian P. Giuliani; Roberto Paiella, both of San Donato Milanese, Italy

[73] Assignee: Anic S.p.A., Palermo, Italy

[21] Appl. No.: 104,389

[22] Filed: Dec. 17, 1979

Related U.S. Application Data

[63] Continuation of Ser. No. 891,274, Mar. 28, 1978, abandoned, which is a continuation of Ser. No. 692,776, Jun. 4, 1976, abandoned.

[30] Foreign Application Priority Data

Jun. 6, 1975 [IT] Italy ............................. 24078 A/75

[51] Int. Cl.³ .................... C08C 19/20; C08C 19/22
[52] U.S. Cl. .................... 525/349; 525/139; 525/346; 525/348; 525/354
[58] Field of Search ............... 525/354, 349, 348, 346

[56] References Cited

U.S. PATENT DOCUMENTS

| | | | |
|---|---|---|---|
| 3,562,303 | 2/1971 | Smith | 260/793 |
| 3,711,455 | 1/1973 | Cucinella | 526/339 X |
| 3,803,106 | 4/1974 | Hayashi | 526/339 X |
| 3,845,027 | 10/1974 | Cucinella | 526/339 X |
| 3,852,250 | 12/1974 | Maxey | 526/34 |
| 3,901,862 | 8/1975 | Cucinella | 526/339 X |

*Primary Examiner*—C. A. Henderson
*Attorney, Agent, or Firm*—Morgan, Finnegan, Pine, Foley & Lee

[57] ABSTRACT

A process for the cross-linking of high density polyethylene in the solid state according to which the polyethylene is admixed with the agents normally used for the vulcanization of unsaturated rubber compounds, then processed into the desired article and thereafter cross-linked at a temperature lower than the melting point of the polyethylene, the process being carried out in polyethylene containing a certain number of unsaturated bonds along the polymer chain.

2 Claims, 1 Drawing Figure

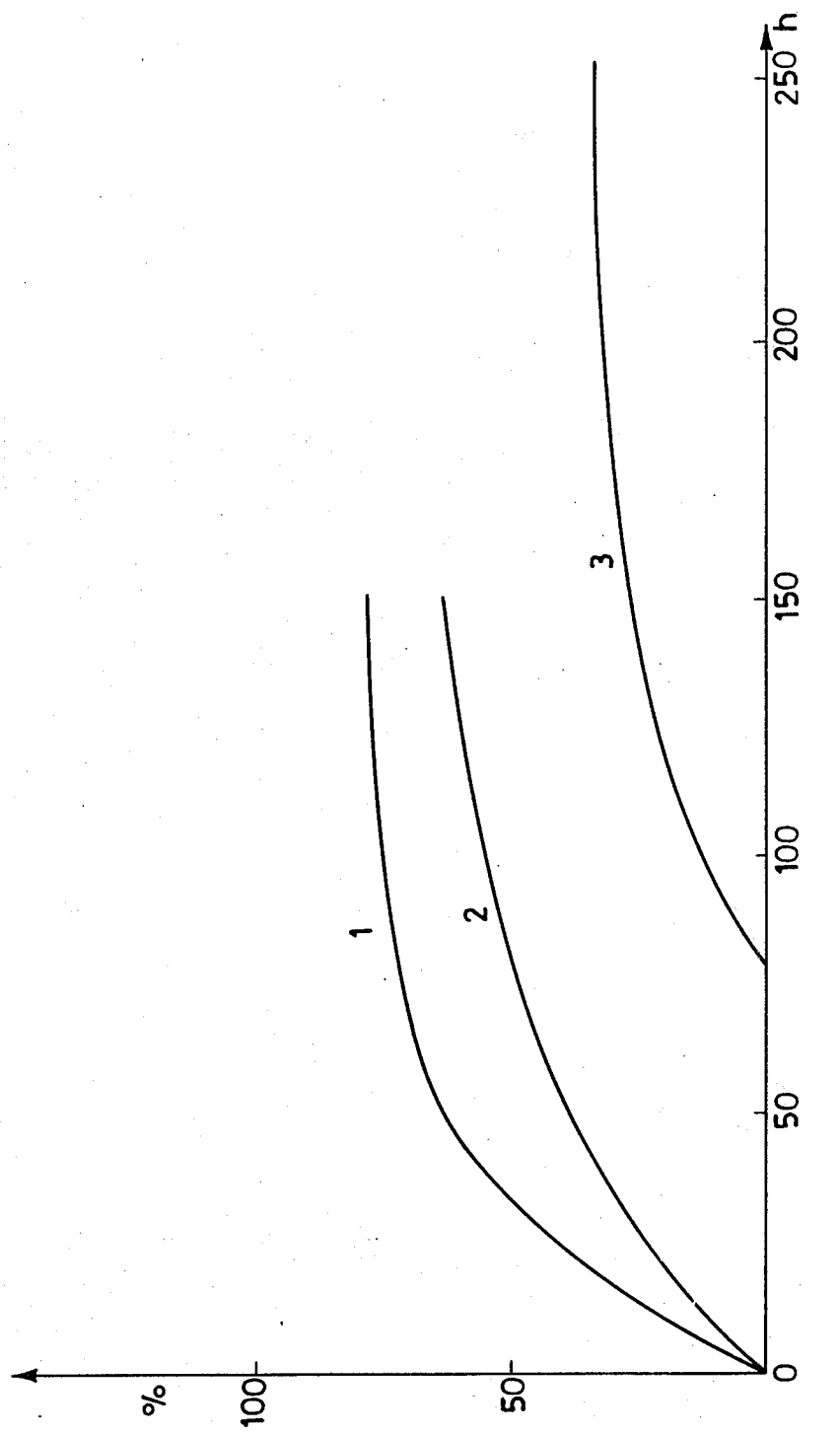

PROCESS FOR THE CROSS-LINKING OF HIGH DENSITY POLYETHYLENE WITH DIENE UNITS IN SOLID STATE

This application is a continuation of Ser. No. 891,274 filed Mar. 28, 1978 now abandoned which is a continuation of Ser. No. 692,776 filed June 4, 1976 now abandoned.

BACKGROUND OF THE INVENTION

The present invention relates to a process for the cross-linking of high density polyethylene in solid state.

Is is known that by the cross-linking process some mechanical properties of the polyethylene, such as the stretching resistance under constant load and the tensile strength in the presence of surface active agents are improved. Moreover, the cross-linked polyethylene shows a better resistance to the chemical agents and, when subjected to high temperatures (greater than 150° C.), maintains the initial shape, even if all the main properties are lost, since the cross-linking prevents creep from occurring.

All these advantageous properties of the cross-linked polyethylene were not fully exploited up to date since the cross-linking process, which usually employs high temperatures (>145° C.) and higher than the melting point of the polyethylene, is inconsistent with the most common processes for the polyethylene processing.

In fact, the cross-linking must take place when the melted material is confined in a mold, as taught by the technology of the thermosetting materials. The mold must be heated to the cross-linking temperature and then cooled to promote the removal of the molding.

Thus, amongst the several technologies for the processing of the polyethylene, only the molding, either in a press or by injection, is consistant with the cross-linking, but much more lasting cycles than the normal ones are involved.

All these difficulties are eliminated by the process described in the present invention, by which it is possible to carry out the cross-linking of polyethylene at temperatures lower than the melting point. A polyethylene product can be thus produced by the most suitable technology (for instance blowing of hollow bodies, extrusion, injection, vacuum forming, rotary molding, etc.), and then carry out the cross-linking at a temperature lower than the melting temperature, at which the product maintains its shape without distortion. Such a cross-linking process, the nature of which will be specified hereinafter, is defined in the present disclosure as solid state cross-linking, whereas according to the conventional processes the polymer must be in the melted condition.

Apart from the afore stated advantages with respect to the processing possibility, the solid state cross-linking imparts to the artifacts outstanding physical and mechanical properties with respect to the conventional melt mass vulcanization, as it was also found by H. BRODY (J. Appl. Poly. Sci. 15, 987–1005, 1971).

In the solid state cross-linking, the cross-linking is limited to the amorphous part between the crystallites, without disturbing the crystalline phase, whereas in the melt mass cross-linking, the cross-linking causes a diminution of the crystalline percentage in the final product to take place.

The maintenance of the crystallinity in the solid state cross-linking gives products showing greater rigidity (about two-fold), higher melting point, higher HDT and Vicat and lower bulking in comparison with melt mass cross-linked artifacts. Both types of cross-linking lead to products resistant to impact and to environmental stress cracking.

The two systems most commonly used for the cross-linking of polyethylene comprise the use of organic peroxides and radiations.

The cross-linking of high density polyethylene in the solid state by means of peroxides is practically impossible: if peroxides are used having high decomposition temperature (<160° C.), both the preparation of the polyethylene-peroxide compound, and the processing of the compound into the desired article without premature cross-linking reactions taking place can be possible, but it will be then impossible to carry out the cross-linking of the resulting article in the solid state, since at the related temperature (<130° C.) the peroxide is not capable of effecting the cross-linking within reasonable times:

if peroxides are used having low decomposition temperatures (<130° C.), the processing of the polyethylene is not possible (melting point: 135° C.) without initiating the decomposition reaction of the peroxide.

An attempt for the solid state cross-linking of high density polyethylene by means of peroxides was successfully effected by H. BRODY (J. Appl. Poly. Sci. 15, 987–1005, 1971) through the hot swelling of the molded article in a mixture of allylmethacrylate-dicumylperoxide.

Such a technology, even if entirely valid for the study of the properties of the solid state cross-linked polyethylene, has of course no possibility of use in the industrial processing.

The cross-linking by means of radiations can be instead carried out on the solid state polyethylene, but the system is effected by serious limitations, due to the costs and to the difficulties of irradiating, with a homogeneous stream of radiations, articles of complicate shape.

SUMMARY OF THE INVENTION

Such a system can be used almost exclusively for the cross-linking of plates and sheets.

We have found, which constitutes the subject of the present invention, that the mentioned difficulties in the cross-linking in the solid state by means of peroxides and of radiations can be avoided starting from high density polyethylene containing a small percentage of unsaturations, uniformly distributed along the polymer chain and in a number such as to maintain practically unchanged the properties of the starting polyethylene, and varying from 0.1 to 100 double bonds for 1000 carbon atoms; these polyethylenes can be cross-linked with every vulcanizing system used in the field of the unsaturated elastomers and, particularly:

sulphur based systems;
systems containing sulphur donors;
alkylphenol-formaldehyde resins;
dinitrosocompounds.

With these systems it is possible to vary within rather broad intervals the induction time and adapt it to the processing technology to be used.

The vulcanizing ingredients are added to the polymers by using the usual equipments for the melt mixing: cylindrical mixer, Banbury, extrusion in a single or two-screw extruder. The suitable temperature range is 150° to 180° C.

The thus obtained compound can be processed by any technology used for the high density polyethylene (blowing of hollow bodies, extrusion, injection, vacuum forming, rotary molding, etc.).

With a suitable induction time, adjusted according to the vulcanizing system, any premature cross-linking can be easily avoided.

properties of the polymer without cross-linking are also reported.

With reference to FIG. 1, the abscissae axis relates to the dwell time in the oven, expressed in hours, the ordinates relate to the gel percentage, the curve 1 relates to the treatment at 125° C., the curve 2 to the treatment at 115° C. and the curve 3 to the treatment at 100° C.

TABLE

| | (1) GEL % | (2) IMPACT IZOD (Kg cm/cm$^2$) | (3) STIFFNESS (Kg/cm$^3$) | (4) $C_S$ (Kg/cm$^2$) | (4) $C_R$ (Kg/cm$^2$) | (4) ALL (%) | (5) E.S.C. (h) | (6) HOT (°C.) | (7) VICAT (°C.) |
|---|---|---|---|---|---|---|---|---|---|
| EB as such | 0 | 9.8 | 10.000 | 255 | — | >1900 | 8 | 60 | 122 |
| EB melt mass cross-linked in the press | 75 | 68 | 6.500 | 191 | 243 | 500 | >600 | 48.5 | 122 |
| EB solid state cross-linked in an oven at 125° C. for 80 hours | 73 | 52 | 13.000 | 258 | 280 | 400 | >600 | 60 | 134 |

(1) GEL: insoluble percentage after 40 hour extraction in boiling xilolo
(2) IMPACT IZOD: ASTM D 256
(3) STIFFNESS: ASTM D 747
(4) TENSILE: ASTM D 638
(5) ESC: ASTM D 1693 (Bent strip test)
(6) HOT: ASTM D 648
(7) VICAT: ASTM D 1525

The thus obtained article is treated in an oven at the temperature of 100° to 130° C. and can be cross-linked. The dwell time in the oven is a function of the gel percentage to be obtained.

Such a solid state cross-linking process is useful for every type of polyethylene containing unsaturations and capable of being cross-linked, and particularly to the types referred to in the Italian Pat. Nos. 872 540 and 939 657 in the name of the same Applicant, and in the U.S. patent applications Nos. 601,179 which is now abandoned, and 601,181 which is now abandoned filed on Aug. 1, 1975.

PREFERRED EMBODIMENTS

EXAMPLE 1

A high density polyethylene (EB) was used containing 1.5% mole of butadiene and having a flow index of 1.7.

In a cylindrical open mixer the polymer was added at the temperature of 160° C. with the following vulcanizing ingredients: EB-100; AO 2246-1 (2,2'-methylenebis (4-methyl-6-tert-butylphenol); Zno-5; stearic acid-1; NOBS Special (NOBS Special: N-oxydiethylbenzothiazole-2-sulfenamide (BAYER))-1.5; Vulkacit DM (Vulkacit DM: dibenzothiazyl disulfide (BAYER))-0.5; Sulphur-3.

The resulting compound was molded in a compression press at 180° C. according to the following two procedures:
  (a) molding for 30 minutes, so as to effect the cross-linking in the press in melted condition;
  (b) molding for 5 minutes, so as to avoid the cross-linking; in fact with the stated ingredients used at the temperature of 180° C., the induction time of the cross-linking is higher than 10 minutes.

The samples molded according to the procedure stated under (b) supra, were cross-linked in the solid state in an oven at the temperature of 100°-115° C. and 125° C. The cross-linking kinetics are reported in the FIG. 1.

The physical, mechanical and environmental properties of the polyethylene cross-linked according to the procedure described under (a) supra and of the same polyethylene cross-linked in the oven at 125° C. for 80 hours are reported in the following table, in which the

EXAMPLE 2

A high density polyethylene (EB) containing 3% mole of butadiene and having flow index of 20 was mixed with the same vulcanizing ingredients according to the same procedure of the Example 1.

By the rotary forming technology a number of containers was produced under the following conditions:
  (a) polyethylene EB: as such; operation temperature 180° C.; total cycle duration: 30 minutes.
  (b) polyethylene EB added with the vulcanizing ingredients; operation temperature: 180° C.; total cycle duration: 30 minutes.

Under these conditions the resulting container is not cross-linked and the cross-linking is carried out in an oven at the temperature of 120° C. for 70 hours.
  (c) Polyethylene EB added with the vulcanization ingredients; operation temperature: 180° C.; total cycle duration: 2 hours.

Under these conditions the resulting container is in the cross-linked condition (50% gel).

The mechanical properties, tested on the samples obtained from the containers produced according to the procedures of (a), (b) and (c), are reported in the following table.

| | GEL (%) | IMPACT IZOD (Kg × cm/cm$^2$) | STIFFNESS (Kg/cm$^2$) | ESC (h) |
|---|---|---|---|---|
| EB as such | 0 | 3 | 11.000 | 0 |
| EB melt mass cross-linked in the mold | 50 | 11 | 7.000 | >600 |
| EB solid state cross-linked in an oven | 50 | 8 | 14.000 | >600 |

EXAMPLE 3

A polyethylene (EB) containing 2% mole of butadiene and having a flow index of 5 was used. In a two screw extruder the polymer was added, at the temperature of 160° C., with the following vulcanizing recipe:
  EB—100; AO 2246—1; ZnO—5; stearic acid—1; NOBS Special—1.5; Vulkacit DM—0.5; Sulfasan R (morpholine disulfide)—3.

The thus obtained compound was molded in an injection press at the temperature of 200° C.; the total dwell time of the material in the press was about 2 minutes and the mold was at room temperature.

The resulting samples were devoid of gel and were cross-linked in an oven at 125° C. for 50 hours.

The mechanical and environmental properties of the injection molded samples, before and after the cross-linking, are reported in the following table:

|  | GEL % | IMPACT IZOD (Kg × cm/cm$^2$) | ESCR (h) | STIFF-NESS (Kg/cm$^2$) |
|---|---|---|---|---|
| EB as such | 0 | 8 | 18 | 10.400 |
| EB solid state cross-linked in an oven at 125° C. for 50 hours | 40 | 28 | >200 | 13.000 |

ESCR "stress rupture" Method ASTMD 2552

We claim:

1. A process for cross-linking high density polyethylene containing diene unsaturation in the amount of 0.1 to 100 double bonds per 1000 carbon atoms which comprises meltmixing said high density polyethylene with a sulfur based vulcanizing system and at a temperature of from 150°–180° C. for a period of time that avoids any premature cross-linking and thereafter heating said polyethylene at a temperature of from 100°–130° C. to obtain high density cross-linked polyethylene.

2. A process as defined in claim 1 wherein the polyethylene contain 1.5 mole percent of butadiene and the sulfur based vulcanizing system contains 1.0 g of 2,2'-methylenebis (4-methyl-6-tert-butylphenol); 5.0 g of zinc oxide; 1.0 g of stearic acid; 1.5 g N-oxydiethylbenzothiazole-2-sulfenamide; 0.5 g dibenzothiozyl disulfide and 3.0 g of sulfur.

* * * * *